UNITED STATES PATENT OFFICE.

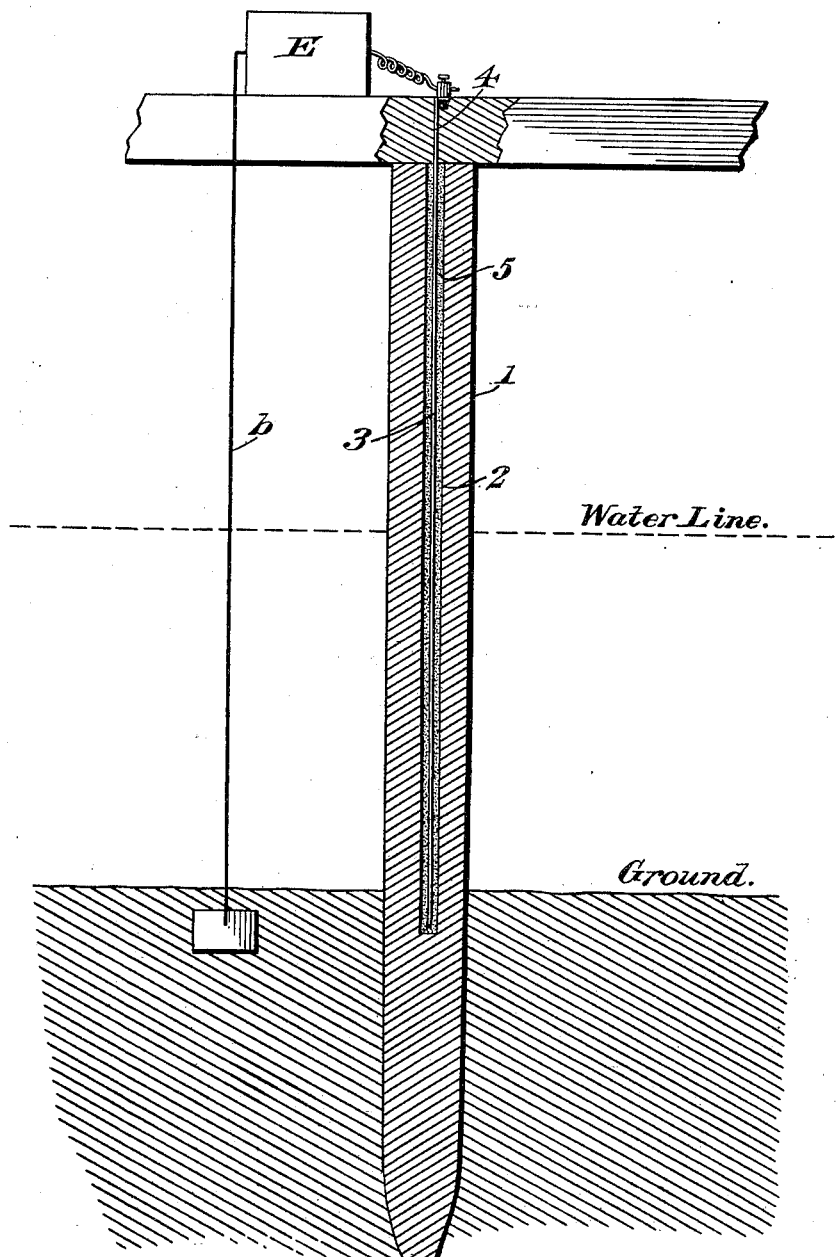

SAMUEL LINCOLN SHUFFLETON, OF SEATTLE, WASHINGTON.

METHOD OF PROTECTING WOODEN PILES.

SPECIFICATION forming part of Letters Patent No. 676,704, dated June 18, 1901.

Application filed August 13, 1900. Serial No. 26,769. (No specimens.)

*To all whom it may concern:*

Be it known that I, SAMUEL LINCOLN SHUFFLETON, a citizen of the United States, residing at Seattle, in the county of King and State of Washington, have invented a new and useful Method of Protecting Wooden Piles, of which the following is a specification.

Piles, posts, and other submerged timbers of bridges, wharves, and other structures arranged in salt water are subjected to the exceedingly destructive action of the teredo and other borers, and in some waters the ravages of these insects are so severe as to greatly impair the piles or other timbers in a very short time. Many expedients have been resorted to for overcoming the destructive influence of these insects, involving covering of the piles and their timbers with protective sheathings, as well as filling the same with protective substances to prevent honeycombing thereof by the borers. However, the expedients heretofore resorted to have either been too expensive or impracticable, so it is the purpose of the present invention to provide simple and efficient means for thoroughly protecting piles or other submerged timbers from borers by causing a complete destruction of the latter from time to time.

To this end the invention primarily contemplates the idea of destroying the teredo or other borers by passing a powerful current of electricity directly through their works or cells in the piles and also to provide means, in connection with the electric current, for subjecting the insects to the action of a poisonous substance, thus insuring the complete destruction of the insects directly in their cells.

Different expedients may necessarily be resorted to for conducting the electric currents through the piles, and also different insecticide substances might be utilized in divers ways, in connection with the electric current, to secure the desired effect; but the preferred embodiment of the invention is represented in the drawing, in which the figure is a sectional view of a wooden wharf-pile, showing the same provided with the electrical conductor and insecticide filling about the conductor, the view also illustrating a complete circuit connection with the electrical conductor of the pile.

In carrying out the invention the pile to be protected, which is designated in the drawing by the numeral 1, is drilled or bored longitudinally to provide therein a central longitudinal hole 2, extending substantially the full length thereof, but terminating short of the solid end of the pile which is driven in the ground, forming the bed of the body of water. The said central longitudinal hole 2, running throughout the pile, must necessarily be of a sufficient length, so as to extend through the portion of the pile exposed in the water to the action of the teredo or other insects, and the same is designed to permanently house therein an electrical conductor 3, which preferably consists of a length of copper wire inserted in the hole 2 and running the full length thereof. The electrical conductor 3 reaches to the bottom or lower end of the hole 2, and the upper terminal 4 thereof extends exterior to the pile, so that the same may be conveniently connected from time to time with a source of elecrical energy, it being the purpose of the present invention to associate a system of piles equipped with the electrical conductor with a suitable source of electrical energy and the usual switchboard arrangements to provide convenient means for switching the current through the conductors of the individual piles whenever desired. However, for illustrative purposes there is shown in the figure of the drawing in diagram a complete electrical circuit, including the conductor 3, within the pile. This electrical circuit includes a dynamo or other source of electrical energy E, which generates alternating or direct currents at a high voltage and having a wire connection $a$ with the exposed terminal 4 of the conductor 3 in the pile, and a ground-wire connection $b$, which is preferably grounded through the water surrounding the protected pile, although it will be readily understood that any other suitable or practical arrangement of the circuit may be utilized in carrying out the invention.

In addition to the electrical conductor which is permanently housed in the central longitudinal hole of the pile the said hole is made sufficiently large throughout its entire length to receive therein a filling 5 of an insecticide substance of low electrical resistance—such, for instance, as sulfate of copper. This insecticide filling is closely packed about the electrical conductor 3 and completely envelops the same, so as to be directly exposed to the current passing through such conductor and the ground connection exterior to the pile. A preferable way of equipping each pile with the conductor and the filling is to bore the same with a hole before being driven into the ground, after which the conductor and insecticide substance are inserted in place.

It is the purpose of the invention to switch an electrical current through the conductors of the individual piles at certain periods, which will of course be determined by the locality in which the structure to be protected is located; but it will be understood that it is desirable to so regulate the electric current which is directed through the conductor 3 as to allow the greatest possible flow of amperage which can be used without danger of fire to the pile. To those familiar with the habits of the teredo and other borers it is known that the same bore cells directly into the pile or submerged timber, and in a pile protected in the manner herein described these cells will intersect or come into very close proximity with the central hole of the pile which contains the electrical conductor and the poisonous substance. Inasmuch as the resistance of the salt water in the holes or cells bored by the insects is necessarily less than that of the wood in the pile, and especially the solid portion thereof, driven into the ground beyond the hole and the electrical conductor, the insects or worms will consequently be placed directly in the path of the current and subjected to the combined destructive action of the current directly on their bodies, the heat produced by the passage of the current through the resistance, the decomposition of the water within the cells or holes, and the poisonous effect of the substance surrounding the electrical conductor, which substance will itself be subjected to disintegration and worked by the current in the path of least resistance into the pile—namely, through the cells or works of the borers.

While the invention has been specifically described for use in connection with wharf-piles and the like, it will be understood that the same may be employed in connection with trestles for bridges and other submerged timbers and any means of supplying the electrical current may be resorted to. It will of course be understood that various changes in the construction and arrangement of instrumentalities may necessarily be resorted to without departing from the spirit or scope of the invention.

Having thus described the invention, what is claimed as new, and desired to be secured by Letters Patent, is—

1. A method of treating submerged wooden piles, which consists in passing a current of electricity from the interior of the pile outward through the pores of the wood.

2. A method of treating submerged wooden piles, which consists in passing a current of electricity through an electrolyte within the body of the pile outward through the pores of the wood.

3. A method of treating submerged wooden piles, which consists in distributing an insecticide substance through the pores of the wood by passing a current of electricity from the interior of the pile outward through the insecticide substance and pores of the wood.

In testimony that I claim the foregoing as my own I have hereto affixed my signature in the presence of two witnesses.

SAMUEL LINCOLN SHUFFLETON.

Witnesses:
  W. E. BUTLER,
  S. W. MINOR.